US012121034B2

(12) United States Patent
Leuschner et al.

(10) Patent No.: US 12,121,034 B2
(45) Date of Patent: Oct. 22, 2024

(54) DEVICE AND METHOD FOR RECOVERING THE INTERNAL BACK-FLESH OF POULTRY

(71) Applicant: Nordischer Maschinenbau Rud. Baader GmbH + Co. KG, Lübeck (DE)

(72) Inventors: Stephan Leuschner, Lübeck (DE); Andreas Landt, Lübeck (DE); Lasse Riggert, Lübeck (DE)

(73) Assignee: Nordischer Maschinenbau Rud. Baader GmbH + Co. KG, Lübeck (DE)

( * ) Notice: Subject to any disclaimer, the term of this patent is extended or adjusted under 35 U.S.C. 154(b) by 164 days.

(21) Appl. No.: 17/911,873

(22) PCT Filed: Mar. 24, 2021

(86) PCT No.: PCT/EP2021/057557
§ 371 (c)(1),
(2) Date: Sep. 15, 2022

(87) PCT Pub. No.: WO2021/191270
PCT Pub. Date: Sep. 30, 2021

(65) Prior Publication Data
US 2023/0111076 A1 Apr. 13, 2023

(30) Foreign Application Priority Data
Mar. 27, 2020 (DE) .......................... 102020108616.4

(51) Int. Cl.
*A22C 21/00* (2006.01)
(52) U.S. Cl.
CPC ...... *A22C 21/0023* (2013.01); *A22C 21/0092* (2013.01)

(58) Field of Classification Search
CPC ............ A22C 21/0023; A22C 21/0092; A22C 21/0003
(Continued)

(56) References Cited

U.S. PATENT DOCUMENTS 3,104,418 A    9/1963  Segur
5,098,337 A *  3/1992  Landt ................. A22C 21/0069
                                                        452/136
(Continued)

FOREIGN PATENT DOCUMENTS

CN    86103341 A    11/1987
CN   102652514 A     9/2012
(Continued)

*Primary Examiner* — Richard T Price, Jr.
(74) *Attorney, Agent, or Firm* — DINSMORE & SHOHL LLP

(57) ABSTRACT

An apparatus and method is for recovering back-flesh from back parts of poultry carcasses having a hip side and body interior side. The back part includes a spinal column and rib structure. A transport conveyor transports the back parts along a transport path with a centre axis in a direction of transport and has a transport element for conveying at least one holding element, arranged on the transport element, for receiving the back part. A first cutting assembly is along the transport path in the region of the transport element and has a loosening means for loosening the back-flesh along the rib structure. A second cutting assembly is along the transport path downstream of the first assembly and has at least one separating knife for separating the back-flesh substantially along the spinal column. The holding element holds the back part on the holding element by non-positive and/or positive locking engagement.

24 Claims, 6 Drawing Sheets

(58) Field of Classification Search
USPC .......................................................... 452/149
See application file for complete search history.

(56) References Cited

U.S. PATENT DOCUMENTS

| | | | |
|---|---|---|---|
| 5,269,722 | A | 12/1993 | Diesing et al. |
| 5,466,185 | A * | 11/1995 | Martin ............... A22C 21/0069 |
| | | | 452/165 |
| 5,697,837 | A | 12/1997 | Verrijp et al. |
| 8,172,653 | B2 | 5/2012 | Landt |
| 9,375,019 | B2 | 6/2016 | Peters et al. |
| 9,648,886 | B2 * | 5/2017 | Vonk ................... A22B 5/0029 |
| 2017/0127690 | A1 | 5/2017 | Inoue et al. |

FOREIGN PATENT DOCUMENTS

| | | |
|---|---|---|
| CN | 103100998 A | 5/2013 |
| CN | 204969171 U | 6/2016 |
| DE | 3939340 C1 | 6/1991 |
| EP | 1430780 A1 | 6/2004 |
| EP | 2101592 B1 | 7/2010 |
| EP | 2420143 A1 | 2/2012 |
| EP | 2574238 B1 | 5/2016 |
| WO | 2008078982 A1 | 7/2008 |

* cited by examiner

DEVICE AND METHOD FOR RECOVERING THE INTERNAL BACK-FLESH OF POULTRY

CROSS-REFERENCE TO RELATED APPLICATIONS

This application is the U.S. National Stage of PCT/EP2021/055900 filed on Mar. 9, 2021, which claims priority to German Patent Application 102020106734.8 filed on Mar. 12, 2020, the entire content of both are incorporated herein by reference in their entirety.

FIELD OF THE INVENTION

The invention relates to an apparatus, configured and adapted for recovering back-flesh or parts thereof from back parts or parts thereof of poultry carcasses having a neck side and a hip side as well as a body exterior side and a body interior side.

The invention relates further to a method for recovering back-flesh or parts thereof from back parts or parts thereof of poultry carcasses having a neck side and a hip side as well as a body exterior side and a body interior side.

BACKGROUND OF THE INVENTION

Such apparatuses and methods are used in the animal-processing industry, in particular in the poultry-processing industry, for recovering back-flesh or parts thereof from back parts or parts thereof of poultry carcasses (also referred to generally as back parts in the following text). Back-flesh recovery generally takes place as an integrated process, which is not carried out separately in the industrial processing of poultry.

After the industrial slaughter of poultry, the poultry carcasses are generally processed further into smaller portions. In the poultry-processing industry, automatic fileting of poultry carcasses has long been known. Owing to the geometric complexity of the poultry carcass, it is dissected in different process steps prior to the actual fileting in order to facilitate further processing. The most frequent intermediate products formed thereby are, firstly by means of a separating cut through the hip of the poultry body, so-called front halves, also called front side, fore-half, poultry body front half, etc., and back halves, also called back side, rear side, rear half, poultry body rear half, etc.

The front halves are essentially the upper body of the poultry carcass. The back halves thus comprise the lower abdomen, including the pelvis. The front halves may additionally comprise extremities, or these are removed in further upstream or downstream process steps.

In addition to the production of front halves and back halves prior to the actual fileting, front halves are frequently segmented further, since this is where there are generally the largest muscle regions of poultry. By means of a separating cut, starting at the breast side of the neck along the respiratory fold, that is to say at the side of the poultry body along the ribs and through the ribs in the direction towards the hip, the breast side and the back side of the poultry body front half are separated from one another. The back side thereby comprises the back part.

By separating the poultry bodies into sub-segments, the complex geometry of the poultry bodies is broken up, whereby intermediate products that are significantly easier to handle and process are obtained. The focus in respect of the different end products to be recovered is also taken into account in the pre-dissection of the poultry bodies. Furthermore, by cutting the poultry carcass into sub-segments, it is possible to provide suitable apparatuses and processing stations which are adapted to the particular geometries of the segments, in order to achieve the highest possible yield of desired end products.

A prominent end product is the breast muscle, or breast fillet, the massive characteristic of which dominates the upper body. The further processing of front halves has thus for a long time focused on harvesting/recovering the breast muscle, or breast fillet, with the highest possible yield efficiency, even though there are further flesh regions which can be harvested or, in light of increasing meat prices and where possible the utilization of the entire poultry carcasses, also should be harvested.

Especially on the back side of the poultry body front half (front half) there are back-flesh regions which should not be ignored and therefore should generally also be harvested. Owing to the relatively small proportion of back-flesh compared to the total yield in the case of poultry carcasses, recovery of the back-flesh has often taken a back seat in the past.

DE 39 39 340 C1 discloses a method and an apparatus for detaching the flesh from poultry bodies. The purpose of the apparatus is to concomitantly recover the flesh located on the ribs in the region of the back during the processing of front halves. The additional recovery of the flesh located on the ribs is to take place by specially shaped and arranged cutting means. However, a complex sequence of cuts is necessary here; moreover, only a small proportion of the adhering flesh can be detached and processed further in this manner, because the flesh is only "concomitantly recovered" during processing of the front halves. Front halves are generally segmented into a breast cap and a back cap in order, for example, to recover flesh parts adhering thereto. However, if the front half is segmented further to produce a breast cap and a back cap, also called a back part, there is no possibility of concomitantly recovering the back-flesh in the course of the recovery of the breast fillet. The back part must therefore be processed separately, whereby separate back-flesh recovery would have to be carried out, which in practice does not take place mechanically.

Further apparatuses and methods are known from the prior art, in which different starting products are used for the recovery of back-flesh. However, the back portions to be processed are the entire back region of the poultry carcass and not only the back parts that are obtained from a front half during production of a breast cap.

WO 2008/078982 A1 discloses a method and an apparatus in which the upper back region is skinned and fileted. The starting product in this case is formed by a whole poultry carcass, in which the breast cap and the wings have already been separated. Processing takes place while the poultry carcass part is being conveyed, suspended by the legs and arranged on a product carrier, into a processing installation. The suspended arrangement of the poultry carcass part on the product carrier offers only low stability for engagement with cutting means provided therefor.

At present, the operation of recovering back-flesh from separated back parts is not carried out in an automated manner. In practice, the back parts obtained are further processed manually, if further processing takes place at all, in that a series of cuts is generally made along the spinal column, starting at the hip-side end of the back part, in the direction towards the neck. If the scapulae have not been removed from the back parts beforehand, there is obtained as the end product a flesh product which includes both scapulae. Such products are very popular in the fast-food industry, for example. The operation of manual separation is time-consuming and cost-intensive and frequently delivers only a low yield from the back parts. Furthermore, manual processing of the back parts involves a high risk of injury owing to the complicated sequence of cuts. Moreover, the positioning and holding of the back parts on automated apparatuses are associated with a high outlay in terms of construction and manufacture owing to the complex geometry of the back parts.

From the available apparatuses and the methods of the prior art, in particular no apparatus or method for recovering back-flesh or parts thereof from back parts of poultry carcasses is known that ensures secure positioning of a back part and wherein at the same time back-flesh is recovered yield-efficiently. The known apparatuses generally have in particular a complex construction as well as extensive method steps in the processing of poultry carcasses, in which back-flesh is recovered—if at all—only as an intermediate product. An apparatus or a method for the cost-efficient and reliable as well as safe recovery of back-flesh or parts thereof from back parts or parts thereof is not available in the prior-known state of the art.

SUMMARY OF THE INVENTION

Accordingly, the object of the invention is to provide an apparatus which ensures the safe, reliable and yield-efficient recovery of back-flesh or parts thereof from back parts or parts thereof. The object consists further in proposing a corresponding method.

This object is achieved by the apparatus mentioned hereinbefore, wherein the back part comprises a spinal column or parts thereof and a rib structure having at least vertebral rib pairs or parts thereof, and wherein the back-flesh includes in particular at least one scapula, which apparatus comprises a transport conveyor which is adapted for transporting the back parts or parts thereof along a transport path with a centre axis M in a direction of transport T and which has a drive unit and a transport element for conveying at least one holding element, arranged on the transport element, for receiving the back part or parts thereof during transport at least in some regions along the transport path; a first cutting means assembly which is arranged along the transport path in the region of the transport element and which has at least one loosening means for loosening the back-flesh at least in some regions substantially along the rib structure; a second cutting means assembly which is arranged along the transport path downstream of the first cutting means assembly in the direction of transport T in the region of the transport element and which has at least one separating knife for separating the cut back-flesh or parts thereof at least in some regions at least substantially along the spinal column, wherein the holding element is so configured that the back part or parts thereof can be arranged on the holding element by non-positive and/or positive locking engagement.

There come into consideration as poultry carcasses in particular chickens. However, the apparatus, in particular the holding element, can also serve for the arrangement of back parts of other poultry, such as ducks, geese, turkeys, pigeons or quails, wherein the size dimensions of the holding element are to be adapted in each case. In the case of the apparatus, the dimensions of the first and second cutting means assemblies would also have to be adapted in order to process different types of poultry.

"Back parts" within the meaning of the invention is to be understood as meaning a region of the front halves of poultry carcasses which has been separated separately and is formed in particular by the back region of the poultry front halves of the poultry carcass. The back part thereby comprises in particular at least one region of the spinal column with at least one region of the ribs as well as the back-flesh connected thereto. The back-flesh preferably has at least one scapula, particularly preferably two scapulae, that is to say there is a scapula on each side of the spinal column. The spinal column of poultry generally further has, at least in some regions, a bony structure, called the notarium in technical jargon, which is formed by a local thickening of the fused thoracic vertebrae. The spinal column within the meaning of the invention thus also comprises the local thickening of the bony structure. The thickening must be avoided in mechanical processing so as, for example, to avoid bone fragments resulting from damage to the bony structure.

The "body interior side" and the "body exterior side" within the meaning of the invention are alternatively also referred to as the internal region of the poultry, or of the back part, and as the external region of the poultry, or of the back part. The body interior side thus forms in particular the internal chamber of the thoracic cavity of the poultry having the vertebrally extending ribs, while the body exterior side characterises the outer region, having the skin or the flesh, which is accessible from outside.

The "neck side" and the "hip side" of the back parts are defined by the segmentation of the poultry carcass. The neck side of the back part is the side that is produced by a cut in the neck region of the poultry, while the hip side is produced when a cut is made in the region of the hip. The back part is thus defined by the anatomy of the poultry carcass and the segmentation that is performed.

Such transport conveyors having the transport element are particularly preferably belt-, band-, chain-, slide- and/or roller-type transport apparatuses. The direction of transport T at the same time also forms the order in which the respective processing stations are arranged one behind the other. The transport path can preferably be continuous and can run at different heights in the plane. Further preferably, the transport conveyor can be in the form of a wheel-type conveyor. This means that the holding elements are arranged on the circumference of a driven wheel and the respective processing stations for recovering the back-flesh are positioned in engagement proximity to the wheel, whereby the corresponding processing and the recovery of the back-flesh takes place.

The arrangement of the cutting means assemblies "in the region of the transport element" within the meaning of the invention means that the first and second cutting means assemblies are so positioned that they can be in engagement with the holding element, having the back part, that is conveyed on the transport element.

In an advantageous embodiment, a "first cutting means assembly having at least one loosening means" within the meaning of the invention is to be understood as being not only a first cutting means assembly having a single loosening means. The first cutting means assembly can in particular also be formed by two spatially separated, separate loosening means, with the purpose of cutting the back-flesh substantially along the rib structure. The loosening means is, for example, a scraper, a knife, or a tool, for loosening the back-flesh from the rib structure, that is to say for removing it from the rib structure at least in some regions. "Substantially along the rib structure" means within the meaning of the invention that the back-flesh is loosened either exactly along the rib structure or along the rib structure at a small distance therefrom, that is to say at a distance from the rib structure in a range of from 0.5 mm to 3 mm.

"Loosening" of the back-flesh "at least in some regions" by means of the loosening means means within the meaning of the invention that the back-flesh is loosened completely, that is to say over the entire length of the centre axis M, or a part-region of the back-flesh is loosened. The back-flesh is thereby not yet separated, that is to say the back-flesh remains connected to the back part at least in one region. "Loosening" is thus to be understood as meaning, for example, cutting the back-flesh along a region defined by the arrangement of the first cutting means assembly. In advantageous embodiments of the invention, complete separation of the back-flesh or parts thereof by means of the first cutting means assembly may be expedient. Loosening can further take place, for example, by scraping, shearing and/or pulling off the back-flesh in the defined region and is included in the term "loosening".

Separation of the cut back-flesh "at least substantially along the spinal column" means within the meaning of the invention either exactly along the spinal column, that is to say in each case directly along the course of the spinal column, or with slight deviations along the spinal column, that is to say with a deviation relative to the spinal column of not more than ±25 mm, which is dependent, however, on the size of the particular poultry carcass. Separation within the meaning of the invention includes, for example, scraping, pulling off, cutting off, detaching, shearing, etc. It is important within the meaning of the invention only that the second cutting means assembly is so configured that the back-flesh is removed as completely as possible from the rib structure and/or the spinal column by means of the separating knives.

By means of the apparatus according to the invention it is ensured, by the combination of the two cutting means assemblies in conjunction with the holding element, that the back-flesh to be separated from the back parts can be separated yield-efficiently, reliably and with high qualities, that is to say that the back-flesh is recovered from the back part as completely as possible and free of damage. It is further ensured that the back-flesh is not contaminated during the recovery of the back-flesh, because the back part is securely positioned on the holding element. Contamination is, for example, bone fragments of the remaining back part, which can occur in the case of incorrect positioning and further processing. At the same time, the apparatus has a construction of low complexity and, associated therewith, a reduced outlay in terms of the method on recovery of the back-flesh. It is additionally advantageous that the apparatus is divided into a first cutting means assembly and a second cutting means assembly, because clean loosening or detachment or removal of the back-flesh from the back part is thereby first carried out, and reliable separation of the back-flesh from the back part is ensured by the further downstream second cutting means assembly. In this manner, back-flesh of high quality, which is free of contamination, can be recovered. The holding element additionally ensures that the back part is fixed securely at all times as it passes through the apparatus, whereby consistent results in the back-flesh recovery are achieved. Because the apparatus is so configured that the back parts can be cut in some regions by the at least one loosening means of the first cutting means assembly, and that the back-flesh cut in some regions can then be separated by means of the separating knives of the downstream second cutting means assembly, an apparatus construction with a low degree of complexity is obtained, whereby the outlay in terms of construction and manufacture is reduced, which in turn results in cost-efficient production of the apparatus. The upstream first cutting means assembly additionally increases the availability of the back-flesh to be loosened, because the back-flesh located on the body exterior side of the back part can thereby purposively be loosened or cut, whereby separation can take place in the downstream second cutting means assembly with a defined sequence of cuts, which results in determinable yields. The means used therefor are selected specifically for the particular operations, which contributes towards efficient processing. The apparatus is preferably free of hydraulic and/or control-electronic means in the context of the active processing of the back parts, which likewise contributes towards cost-efficient processing in that the outlay in terms of investment and maintenance is reduced. The apparatus according to the invention thus results in a higher quality of the recovered back-flesh, an increased yield and low production and operating costs of the apparatus. Dividing the apparatus into a first cutting means assembly and a second cutting means assembly further offers the advantage that the two cutting means assemblies can be arranged downstream of one another along the transport path, whereby the back parts can be guided on the same holding elements and at the same processing speed in both assemblies and the respective cutting means assemblies can be set to the exact requirements. As a result, time-consuming repositioning of the back parts with the loosened back-flesh no longer has to be carried out, but the back part can be guided by non-positive and/or positive locking engagement on the same holding element throughout the entire operation of recovering the back-flesh.

The holding element allows the back part to be arranged specifically and as required. Because the back part can be arranged by non-positive and/or positive locking engagement, the back part is reliably secured over the entire transport path. In this manner, the further components of the apparatus can be oriented therewith so as to perform targeted processing, in particular the back part is reliably secured against high shear forces that occur. The loosening and separation of the back-flesh from the back part leads to mechanical stress, but fixing to the holding element prevents any change in position.

A preferred embodiment is characterised in that there is arranged upstream of the first cutting means assembly a pressing device having a pressing element, which pressing device is adapted to press the received back part on the holding element from the body exterior side by means of the pressing element. In this manner, it is ensured that the back parts are in each case arranged at the same position on the holding elements prior to loosening by means of the first cutting means assembly. This leads to uniform results in the back-flesh recovery and reduces miscuts, which leads to undesirable rejects. The pressing device is further preferably arranged to assist with reliable and desired positioning of the holding element during the operation of positioning or fixing the back part on the holding element. The use of a pressing device additionally promotes results that are reproducible and as consistent as possible in the back-flesh recovery, because the back parts are thereby arranged on the holding elements preferably with a uniform pressing pressure. The procedure of positioning the back parts on the holding elements is additionally facilitated by the pressing device, because the back parts simply have to be placed on the holding elements and can then be positioned automatically by the pressing element. In this manner, such apparatuses having a pressing device are suitable for automated operation and thus permit a higher throughput of back parts.

The pressing device is arranged particularly preferably in the region in which back parts are mounted on the apparatus, that is to say prior to the non-positive and/or positive locking arrangement of the back part. The pressing element is preferably resiliently mounted so as to press the back part on the holding element evenly and in particular with a maximally adjustable force.

An advantageous further development is distinguished in that the holding element is so configured that the back part or parts thereof can be arranged on the holding element in the direction of transport T along the transport path with the neck side in front. Owing to the complex geometry of the back parts, the neck-side arrangement of the back parts on the holding element ensures that the downstream incision by means of the first cutting means assembly performs reliable loosening of the back-flesh. The neck side of the back part of poultry carcasses is generally narrower than the hip side, and the hip-side region generally comprises the higher proportion of back-flesh. Thus, in the case of the neck-side arrangement of the back part on the holding element, the incision by means of the first cutting means assembly takes place starting from the narrower region towards the wider region. In this manner, the loosening means can reliably be guided over the entire back part, whereby a high yield is additionally obtained. The costal arches of poultry naturally generally extend in an inclined manner, that is to say in an arc shape, so that the at least one loosening means extends along the ribs and is preferably so configured.

In a further advantageous embodiment of the invention, the first cutting means assembly, in particular the at least one loosening means, is configured so as to be deflectable against a spring force by means of a spring element. In this manner, even loosening by means of the cutting means of the first cutting means assembly takes place because, if the applied force is too high, the at least one loosening means is deflected against the spring force. This prevents possible damage to parts of the apparatus and also to the back parts, in particular to the rib structure, whereby the risk of contamination, for example bone fragments, is avoided. Furthermore, in this manner the loosening means cuts as close to the rib structure as possible over the entire back part, which results in high yields. The at least one loosening means can further preferably be resiliently mounted by means of the spring element such that the at least one loosening means is configured and adapted to be deflectable perpendicular to the direction of transport T if required, for example in the event of obstruction by bone parts.

An expedient embodiment of the invention is characterised in that the first cutting means assembly is formed by a pair of at least substantially opposing loosening means, wherein the loosening means are arranged on either side of the transport path, such that, between the two loosening means in the region of the centre axis M, a gap A for avoiding the spinal column is formed by the mutually opposing loosening means. The size of the gap A is preferably configured so as to be adjustable between the loosening means. Further preferably, the distance of the gap A is in the range between 2 and 24 millimetres. By means of the pair of loosening means, the back-flesh, which is naturally separated by the spinal column, is cut evenly and reliably, whereby preferably only a single processing step of loosening is necessary, which contributes towards efficient processing of the back part. Back parts have a substantially symmetrical structure, and for this reason the loosening means preferably likewise have a symmetrical construction relative to one another.

A further expedient embodiment of the invention is characterised in that the loosening means have a curved shape and are configured to cut the back part or parts thereof along the course of the direction of transport T starting from the neck side and to leave the back part or parts thereof again at the hip side, wherein the loosening means loosen the back-flesh along the rib structure. The curved shape of the loosening means preferably corresponds to the natural shape of the rib structure of poultry, whereby a high yield of the separable back-flesh can be achieved. The size and inclination of the respective shape of the loosening means is dependent on the back part to be processed, in particular on the type of poultry. The loosening means are particularly preferably so chosen in terms of their size and arrangement that they loosen as close as possible above the costal arches, starting from the body exterior side of the back part, or cut according to the form of the loosening means. In this manner, the highest possible yield of back-flesh is obtained.

In a further advantageous embodiment of the invention, at least one of the loosening means is adjustable in terms of height relative to the holding element and/or in terms of distance from the centre axis M. As a result of the adjustability, the at least one loosening means can be adjusted exactly to the respective requirements of the back part of the poultry carcass that is to be processed, in particular different height adjustments are to be made for different types of poultry to be processed. In a further preferred embodiment, the apparatus comprises at least one sensor device for detecting the dimensions and/or geometry of the back part so as to adjust and orient the first and/or second cutting means assembly, or the at least one loosening means, in terms of its height arrangement and/or in terms of its distance from the centre axis M in accordance with the acquired data.

A preferred further development of the invention is distinguished in that the at least one separating knife is configured and adapted for completely separating the back-flesh at least substantially along the spinal column. Because the incision of the loosening means is made preferably along the costal arches, the region of the spinal column is generally avoided, whereby the back-flesh remains connected to the back part in this region. The at least one separating knife thereby detaches the cut and loosened back-flesh from the remaining connections with the back part, whereby the back-flesh can be separated substantially completely. By the separation of the back-flesh by means of the at least one separating knife along the spinal column, reliable and yield-efficient separation of the back-flesh from the back part is thus carried out.

In a particularly preferred further development of the invention, the at least one separating knife is configured and adapted so as to be adjustable in terms of height relative to the holding element. As a result of the adjustability, the at least one separating knife can be adjusted exactly to the particular requirements of the back part of the poultry carcass that is to be processed, in particular different height adjustments are to be made for different types of poultry to be processed. In a further preferred embodiment, the apparatus comprises at least one sensor device for detecting the dimensions and/or geometry of the back part, in order to adjust and orient the first and/or second cutting means assembly, or the at least one separating knife, in terms of its height arrangement and/or in terms of its distance from the centre axis M in accordance with the acquired data.

A further advantageous embodiment of the invention is characterised in that the at least one separating knife is configured so as to be deflectable against a spring force by means of a spring element. In this manner, even loosening by means of the cutting means of the second cutting means assembly takes place because, if the applied force is too high, the at least one separating knife is deflected against the spring force. This prevents possible damage to parts of the apparatus and also to the back parts, in particular to the spinal column, whereby the risk of contamination, for example by bone fragments, is avoided. Furthermore, in this manner the at least one separating knife cuts as close to the spinal column as possible over the entire back part, which results in high yields. The at least one separating knife can further preferably be resiliently mounted by means of the spring element such that the at least one separating knife is configured and adapted to be deflectable perpendicular to the direction of transport T if required, for example in the event of obstruction by bone parts.

In a further advantageous embodiment of the invention, the at least one separating knife is v-shaped. In this manner, a convenient separating cut into the back part is possible, whereby the back-flesh can be recovered as yield-efficiently as possible. Furthermore, the at least one v-shaped separating knife corresponds to the contour of the spinal column of the back part, or the shape of the notarium, the bony structure of the fused thoracic vertebra, which leads to reduced wear of the separating knife and, on the other hand, prevents damage to regions of the back part. The v-shape can further also have a u-shape or the like, provided that there is separation of the back-flesh in the region of the spinal column, avoiding the spinal column.

A preferred further development of the invention is distinguished in that the transport conveyor has an upper run and a lower run, wherein the first cutting means assembly and/or the second cutting means assembly is arranged in the region of the lower run. By configuring the transport conveyor as an upper run and a lower run, gravity is used in the recovery of the back-flesh in that the first and/or second cutting means assembly is arranged in the region of the lower run, because the back-flesh, after it has been loosened and/or separated, is spaced apart by gravity from the back part fixed to the holding element, whereby removal is facilitated. The division into an upper run and a lower run further permits a space-saving arrangement of the apparatus.

In a particularly preferred further development of the invention, at least one discharge device for discharging the separated back-flesh and/or the back part or parts thereof freed of the back-flesh is arranged at least in some regions along the transport path in the direction of transport T, in particular beneath the first cutting means assembly and/or beneath the second cutting means assembly. The discharge device in a simple manner allows the recovered, separated back-flesh to be discharged and optionally fed in an automated manner to further processing stations. The discharge device is preferably in the form of a transport belt or conveyor belt, further preferably in the form of a gripping element.

A further expedient embodiment of the invention is characterised in that the back part or parts thereof can be arranged by non-positive and/or positive locking engagement on the holding element with the body interior side, in particular only in the region of the spinal column and/or of the rib structure having the rib pairs. That is to say, the holding element engages the spinal column and/or the rib structure in the region of the ribs and/or in the rib-free region; the rib-free regions are also referred to as the spaces of the rib structure. In this manner, a non-positive locking engagement takes place in particular at least as a result of the fixing to the spinal column, a combined positive-locking engagement is additionally obtained by the fixing of the ribs.

Alternatively, it is possible to carry out either only engagement into the spinal column, without producing a positive-locking connection with the rib structure, or only an arrangement of the at least one holding element in the free regions of the rib structure in order to produce positive-locking engagement. It is thus ensured that, according to the intended use of the holding element, a reliable possibility for securely arranging the back part is provided. The type of fixing can additionally be dependent on the type of poultry and on the size of the respective back parts. Furthermore, processing stations which are potentially arranged downstream have an influence on the desired fixing of back parts to the holding elements in that different options for fixing are possible according to the structural design of the apparatus. Advantageously, non-positive and positive locking, releasable fixing of the spinal column and of the rib structure is carried out. Further preferably, the releasable fixing is carried out along the entire spinal column, which has remained in the back part.

In a further advantageous embodiment of the invention, the holding element comprises at least one retaining tooth which is configured and adapted to be in operative connection by non-positive and/or positive locking engagement with the back part in the region of the spinal column and/or of the rib structure having the rib pairs. The at least one retaining tooth situationally permits reliable fixing of the back part. The at least one retaining tooth thereby performs a dual function in that on the one hand non-positive locking engagement is conceivable, in that the spinal column and/or at least one region of the ribs are held, and on the other hand positive-locking fixing of the back part takes place, in that the at least one retaining tooth is arranged between two ribs. In a preferred embodiment, the at least one retaining tooth is configured so as to be manoeuvrable, that is to say pivotable about an axis. Particularly preferably, the holding element comprises from two to ten independent or connected retaining teeth which are pivotably arranged opposite one another in two rows.

According to a further preferred embodiment, the holding element comprises at least one trigger element, wherein the trigger element is in operative connection with at least one of the retaining teeth such that the trigger element allows the back part arranged on the holding element and fixed by means of the at least one retaining tooth to be released. The trigger element represents a convenient option for permitting release of the at least one retaining tooth. The trigger element is preferably so configured that it can be actuated manually and/or mechanically, in particular in an automated manner. This allows the holding elements to be integrated into an automated process, wherein the trigger element permits control and automatic mounting and removal of back parts. The trigger element is preferably in the form of a circular object, in particular a running wheel, so as to be in operative connection at least in some regions with a guide rail, in order to carry out guiding of the trigger element.

An advantageous further development is distinguished in that the apparatus comprises an engagement element which is configured and adapted to act together with the trigger element of the holding element in order, if required, to carry out release of the arranged back part from the holding element in that the at least one retaining tooth is released. This makes it possible, for example, for the apparatus to be operated continuously in an automated manner, whereby efficient and resource-saving processing of back parts takes place. The engagement element can preferably be a guide rail or a cam track. The running wheels of the trigger element can preferably be guided in the engagement element in order to effect triggering or closing of the holding element or fixing of the back part according to the profile of the engagement element.

The object is also achieved by a method, wherein the back part comprises a spinal column or parts thereof and a rib structure having at least vertebral rib pairs or parts thereof, and wherein the back-flesh includes at least one scapula, which method comprises the steps: providing the back parts or parts thereof to be processed on a transport conveyor which is arranged along a transport path with a centre axis M in a direction of transport T and which has a drive unit and a transport element; positioning the back parts or parts thereof to be conveyed by non-positive and/or positive locking engagement on at least one holding element arranged on the transport element; transporting the back part or parts thereof in the direction of transport T along the transport path; guiding the back part or parts thereof along a first cutting means assembly which is arranged along the transport path in the region of the transport element and which has at least one loosening means; loosening the back-flesh at least substantially in some regions along the rib structure by means of the at least one loosening means; guiding the back part or parts thereof with the cut back-flesh along a second cutting means assembly which is arranged along the transport path downstream of the first cutting means assembly in the direction of transport T in the region of the transport element and which has at least one separating knife; separating the back-flesh at least in some regions at least substantially along the spinal column.

In order to avoid repetition, reference is made in connection with the method according to the invention to the advantages already outlined in detail in connection with the apparatus according to the invention. These advantages apply analogously also to the method according to the invention described in the following text.

A further development is characterised in that the back part, before, during and/or after positioning on the holding element by non-positive and/or positive locking engagement, is pressed onto the holding element from the body exterior side by means of a pressing device having a pressing element.

A preferred further development of the invention is distinguished in that the back part or parts thereof is transported on the holding element in the direction of transport T along the transport path with the neck side leading.

In a further advantageous embodiment of the invention, the back part or parts thereof is cut by means of a pair of opposing loosening means along the course of the direction of transport T starting from the neck side and the loosening means leave the back part or parts thereof again at the hip side, wherein the back-flesh is loosened by the loosening means along the rib structure.

An expedient embodiment of the invention is characterised in that processing by the first cutting means assembly and/or by the second cutting means assembly takes place in the region of a lower run of the transport conveyor.

According to a further preferred embodiment of the invention, the separated back-flesh and/or the back part or parts thereof freed of the back-flesh is discharged by means of at least one discharge device arranged at least in some regions along the transport path, in particular beneath the first cutting means assembly and/or beneath the second cutting means assembly.

A further expedient embodiment of the invention is characterised in that the back part or parts thereof is held with the body interior side on the holding element by non-positive and/or positive locking engagement, in particular only in the region of the spinal column and/or of the rib structure having the rib pairs.

A preferred further development of the invention is distinguished in that the back part or parts thereof is in operative connection with the back part or parts thereof by non-positive and/or positive locking engagement in the region of the spinal column and/or of the rib structure having the rib pairs by means of at least one retaining tooth comprising the holding element.

A further expedient embodiment of the invention is characterised in that, on separation of the back-flesh, at least one scapula or parts thereof remains in the back-flesh.

The method is particularly preferably carried out with an apparatus as described herein.

The advantages and effects arising therefrom have already been described in connection with the apparatus, and for this reason, in order to avoid repetition, reference is made to the preceding passages.

BRIEF DESCRIPTION OF THE DRAWINGS

Further expedient and/or advantageous features and further developments relating to the apparatus and to the method will become apparent from the description. Particularly preferred embodiments of the apparatus and the method will be explained in greater detail with reference to the accompanying drawings, in which.

DETAILED DESCRIPTION OF THE INVENTION

Figure 1:
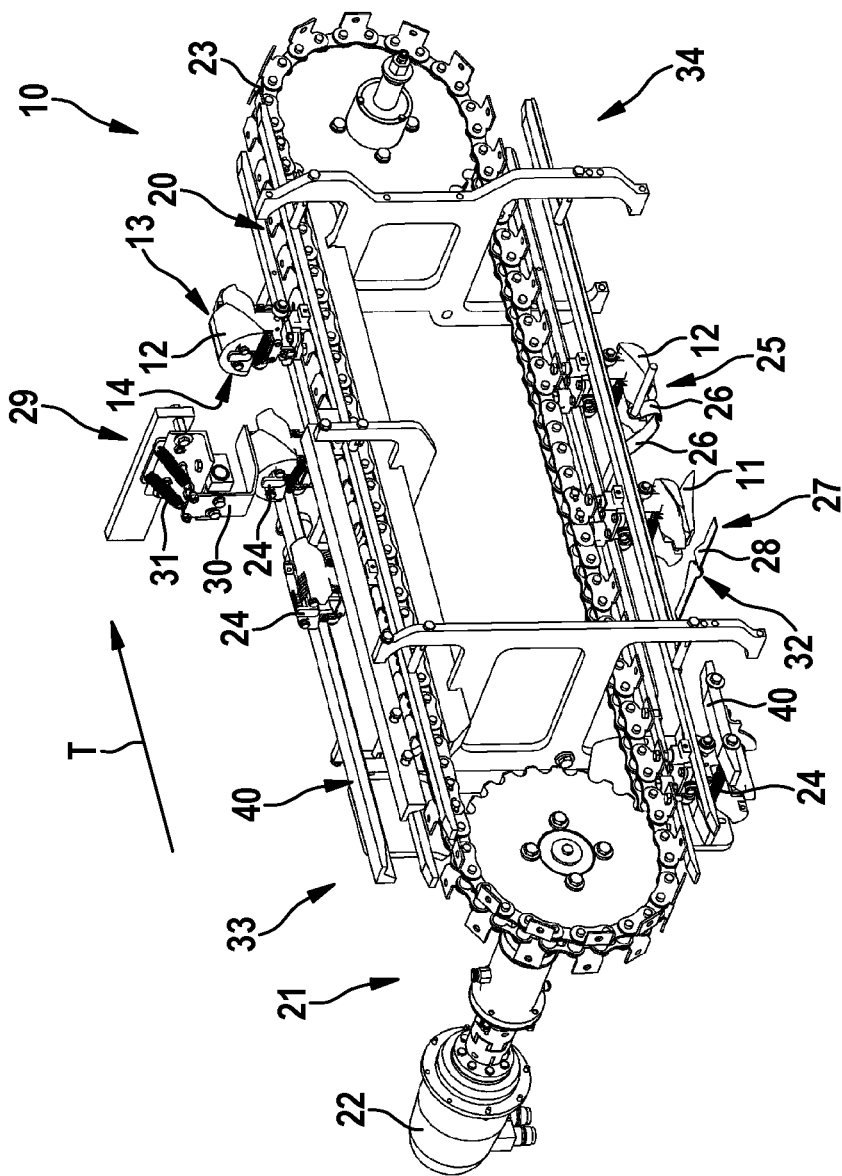
FIG. 1 is a schematic illustration of an apparatus according to the invention in a perspective view.

The apparatus according to the invention and the method according to the invention will be described with reference to the above-mentioned figures. In order to avoid repetition, the comments made in relation to the apparatus also apply to the method according to the invention, so that in the following text comments will be made only in relation to selected aspects of the method according to the invention, isolated from the apparatus according to the invention.

The apparatus shown in the drawing is configured and adapted for recovering back-flesh from back parts of poultry carcasses. The invention likewise relates to apparatuses with which flesh regions are to be recovered from animal bodies, for example fish or parts thereof or halves of fish bodies, which can be positioned with their bone structure on a holding element according to the invention of the apparatus.

The apparatus 10 shown in FIG. 1 is configured and adapted for recovering back-flesh 11 or parts thereof from back parts 12 or parts thereof of poultry carcasses—not shown in the figures—having a neck side 13 and a hip side 14 as well as a body exterior side 15 and a body interior side 16, wherein the back part comprises a spinal column 17 or parts thereof and a rib structure 18 having at least vertebral rib pairs 19 or parts thereof, and wherein the back-flesh 11 includes in particular at least one scapula—not shown in the figures—, which apparatus comprises a transport conveyor 21 which is adapted for transporting the back parts 12 or parts thereof along a transport path 20 with a centre axis M in a direction of transport T and which has a drive unit 22 and a transport element 23 for conveying at least one holding element 24, arranged on the transport element 23, for receiving the back part 12 or parts thereof during transport along the transport path 20 at least in some regions; a first cutting means assembly 25 which is arranged along the transport path 20 in the region of the transport element 23 and which has at least one loosening means 26 for loosening the back-flesh 11 at least in some regions substantially along the rib structure 18; a second cutting means assembly 27 which is arranged along the transport path 20 downstream of the first cutting means assembly 25 in the direction of transport T in the region of the transport element 23 and which has at least one separating knife 28 for separating the cut back-flesh 11 or parts thereof at least in some regions at least substantially along the spinal column 17, wherein the holding element 24 is so configured that the back part 12 or parts thereof can be arranged on the holding element 24 by non-positive and/or positive locking engagement.

Figure 4:
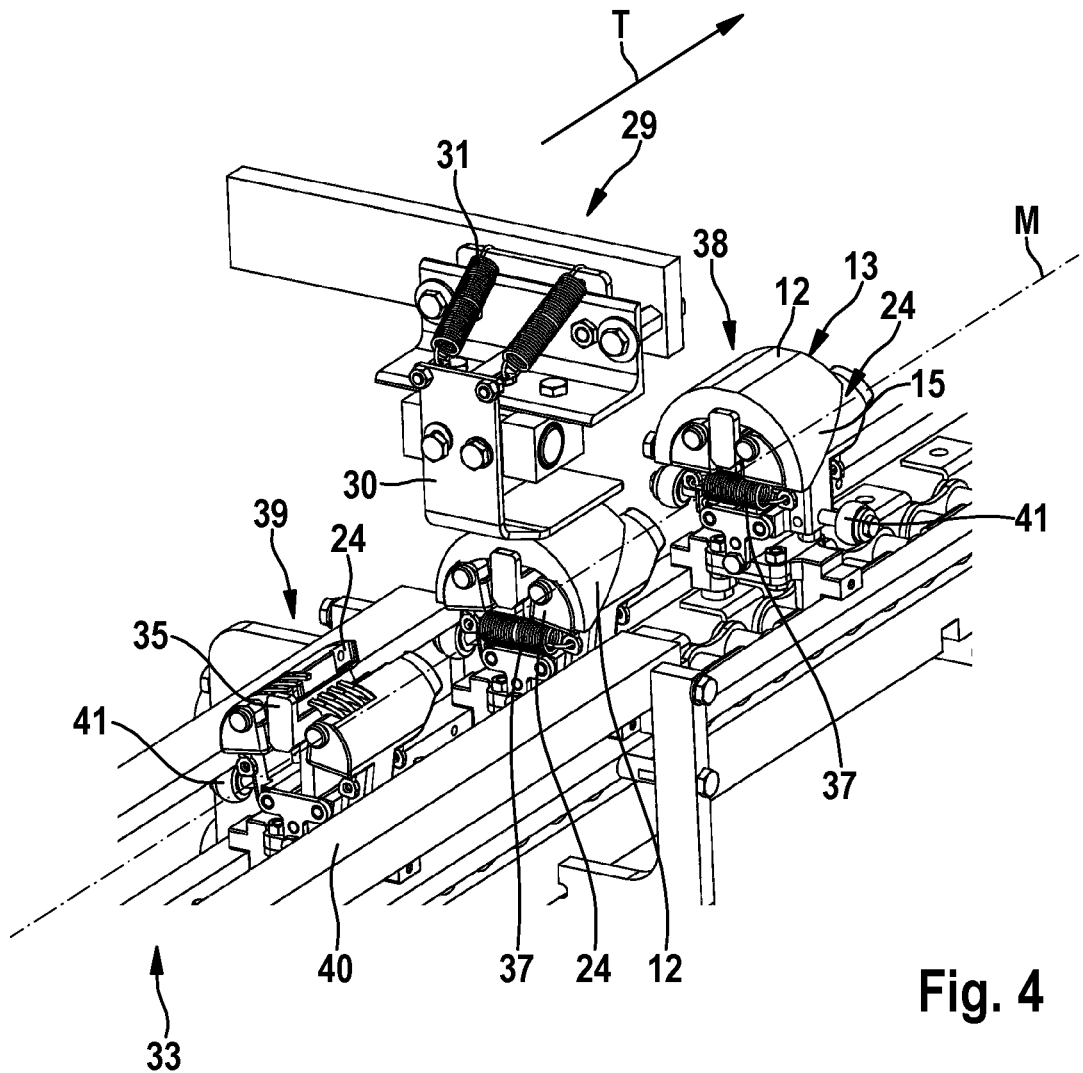
FIG. 4 is a schematic detail view of a pressing device of the apparatus shown in FIG. 1.

For better understanding of the invention, the anatomy of the back parts 12 having the back-flesh 11 to be recovered which are to be arranged by means of the at least one holding element 24 will be described in detail with reference to FIG. 2. Furthermore, back parts 12 are shown in FIG. 1 and FIG. 4 during the operation of positioning on holding elements 24. The holding element 24 is configured and adapted in particular for the automatic or semi-automatic arrangement, positioning and fixing of the back parts 12. In addition to the anatomical parts mentioned above, back parts 12 generally further comprise at least one scapula—not shown in the figures—and at least one skin layer, which forms the outermost layer of the body exterior side 15. In the present figures, the back part 12 is shown only schematically and in a highly simplified manner, without depicting specific anatomical features of the above-mentioned parts in detail. The back part 12 is depicted in a simplified manner as a symmetrical body part, although natural products do not generally exhibit such perfectly matching symmetries. The back-flesh 11 located on the back part 12 is accessible predominantly via the body exterior side 15 and extends above the rib structure 18 and also in part above the spinal column 17. Fixing of the back part 12 on the holding elements 24 preferably takes place only via engagement into the body interior side 16, the body exterior side 15 is not in direct contact with the holding element 24. The skeletonised region of the back part 12 comprises especially the spinal column 17 and the ribs, the ribs located in the back part 12 generally being connected to the spinal column 17. The ribs normally occur as rib pairs 19, that is to say in each case two ribs extend along the spinal column 17 substantially symmetrically to one another, so that two ribs opposite the spinal column 17 in each case form a rib pair 19. All the ribs or rib pairs 19 form the rib structure 18. On the whole, the actual structure of the back part 12, that is to say how many rib pairs 19 the back part 12 comprises, is immaterial for the apparatus 10 according to the invention and for the use of the holding element 24, as long as an arrangement with the body interior side 16 with the holding element 24 is possible and provided that processing by means of the first cutting means assembly 25 and the second cutting means assembly 27 can be carried out. Advantageously, however, the number of retaining teeth 35 on the holding element 24 corresponds to the number of rib pairs 19 or rib spaces. The at least one holding element 24 is configured and adapted so as to actively engage and fix the back part 12 from the body interior side 16 in the region of the hip side 14, that is to say to engage the rib structure 18 and/or the part of the spinal column 17 located in that region, which is shown in simplified form in FIG. 4 during the pressing operation by means of the pressing device 29. In simple terms, the holding element 24 is so configured that it corresponds in shape to the back part 12 to be arranged thereon.

The features and further developments and also the method steps that are described in the following text represent preferred embodiments when considered alone or in combination with one another. It is explicitly pointed out that features and method steps which are combined in the description and/or the drawing or which are described in a common embodiment can also further develop the apparatus 10 described above and the method described below functionally independently.

Figure 3:
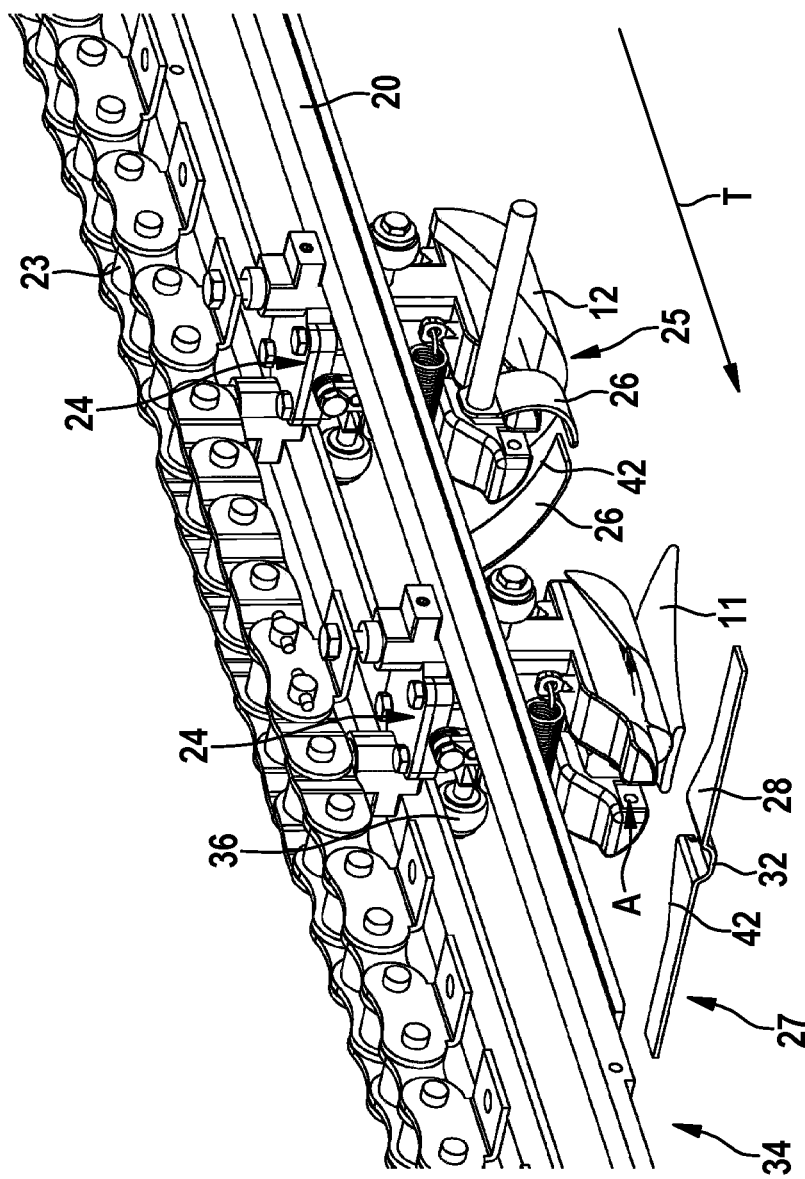
FIG. 3 is a schematic detail view of a first and a second cutting means assembly of the apparatus shown in FIG. 1.

As is apparent from FIG. 3, the back-flesh 11 can preferably at least substantially only be cut or loosened from the back part 12 by means of the first cutting means assembly 25 and is not yet separated completely. The remaining part of the back-flesh 11 which has not yet been cut or loosened remains connected to the back part 12 and is then separated completely by means of the second cutting means assembly 27. Further preferably, the separated back-flesh 11 can subsequently be processed further on apparatuses—which are not shown in the figures. As is shown in FIGS. 1, 3, 4 and 5, a plurality of holding elements 24 each having back parts 12 arranged thereon are particularly preferably arranged on the transport element 23 of the transport conveyor 21 and guided continuously or discontinuously on the apparatus 10 through the respective cutting means assemblies 25, 27. The first cutting means assembly 25 and/or the second cutting means assembly 27 in particular perform the cutting operation in that the continuous transport of the back parts 12 on the transport element 23 leads to the back part 12 coming up against a cutting edge 42 of the respective cutting means or knife, that is to say against the at least one loosening means 26 and against the at least one separating knife 28. The first cutting means assembly 25 and/or the second cutting means assembly 27, or the cutting means or knife thereof, are configured with their cutting edge preferably perpendicular to the transport path 20 and are adjustable relative thereto.

The term transport path 20 refers to the path along the apparatus 10, on which the devices for processing or handling the back parts 12 are arranged or can be arranged, and ultimately describes a three-dimensional region over which the back parts 12 travel or through which they pass as they are transported in the direction of transport T. When there is a device for processing or handling the back parts 12 in the transport path 20 of the back parts, for example the first cutting means assembly 25 having the at least one loosening means 26 or the second cutting means assembly 27 having the at least one separating knife 28, the back part 12 is in engagement or interacts therewith as it passes. The direction of transport T represents the course of the transported holding elements 24 on the transport conveyor 21, and thus also the course of the respective guided back parts 12, whereby the respective processing steps on the back parts 12 are also defined. In the case of a continuous course of the transport path 20, as is shown for example in FIG. 1, the direction of transport T changes in the schematic illustration over the transport path 20 owing to the division of the apparatus 10 into an upper run 33 and a lower run 34.

Figure 5:
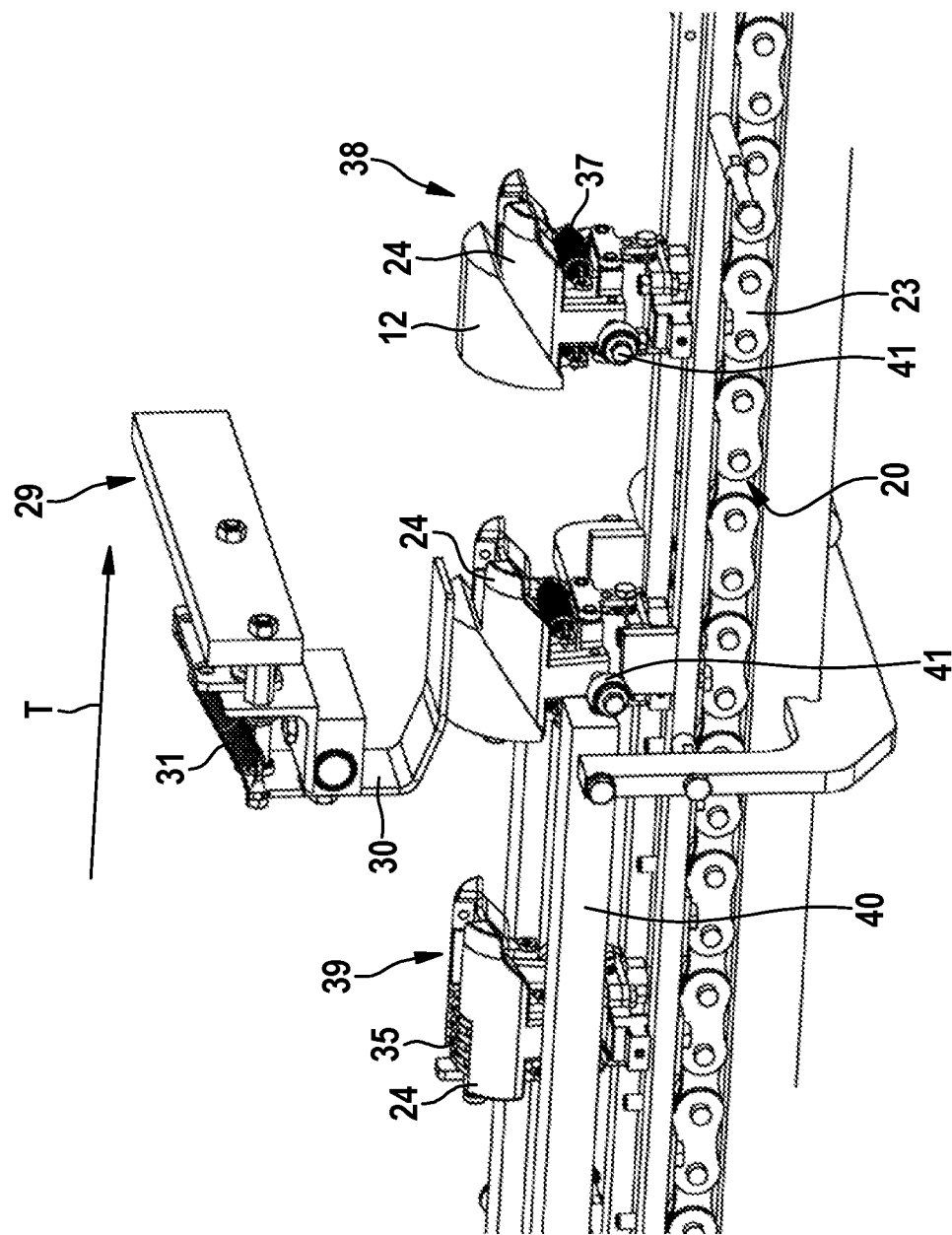
FIG. 5 is a schematic side view of the pressing device shown in FIG. 4.

There is preferably arranged upstream of the first cutting means assembly 25 a pressing device 29 having a pressing element 30, which pressing device is adapted to press the received back part 12 on the holding element 24 from the body exterior side 15 by means of the pressing element 30. FIG. 4 and FIG. 5 show the pressing device 29 in each case with the pressing element 30. The pressing element 30 is thereby in the form of a planar element in order to ensure that pressing against the body exterior side 15 of the back part 12 is as even as possible. The pressing element 30 can also correspond to the contour of the body exterior side 15 of the back part 12. The pressing device 29 can be resiliently mounted. In FIG. 4 and FIG. 5, the pressing element 30 is for this purpose provided with two tension springs 31, which leads to consistent pressing results. The pressing device 29 assists with the positioning of the back part 12 on the holding element 24, and for this reason the pressing device 29, as is shown in FIG. 1, FIG. 4 and FIG. 5, is arranged in the region in which the back part 12 is received—which is not shown in detail in the figures. The pressing element 30 of the pressing device 29 presses the back part 12 onto the holding element 24 after it has been received and holds the back part 12 at least temporarily in position on the holding element 24. Further preferably, pressing of the back part 12, or maintenance of pressing of the back part, by means of the pressing element 30 is to take place at the same time as closing and fixing of the holding element 24, or on engagement of the retaining teeth 35 into the rib-free regions of the back part 12.

Figure 2:
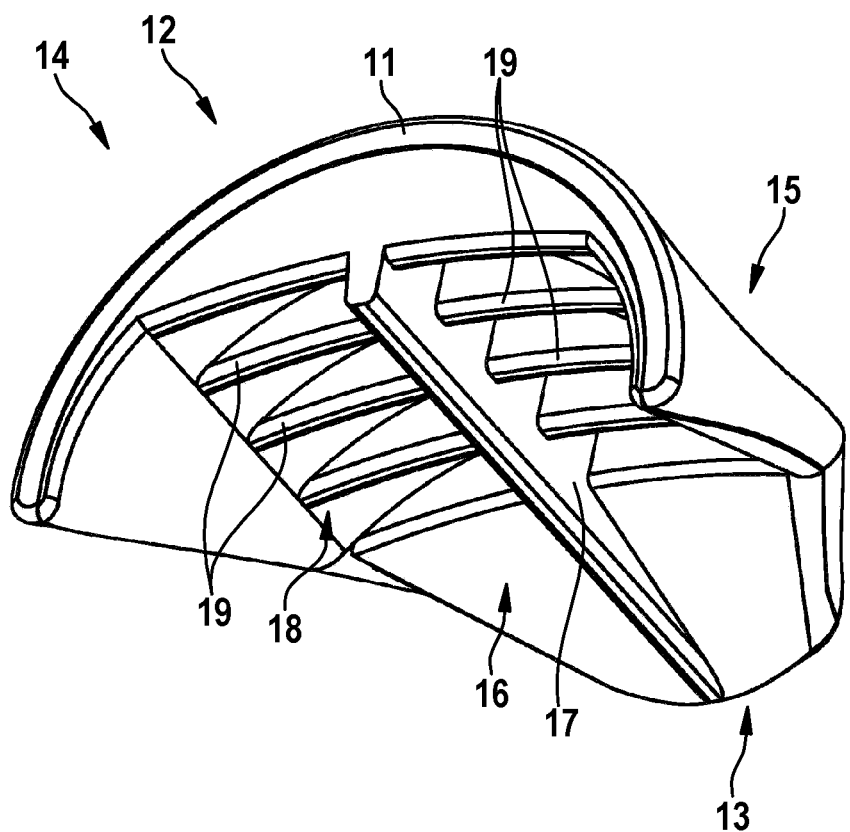
FIG. 2 is a schematic illustration of a back part of a poultry carcass in a perspective view.
Figure 6:
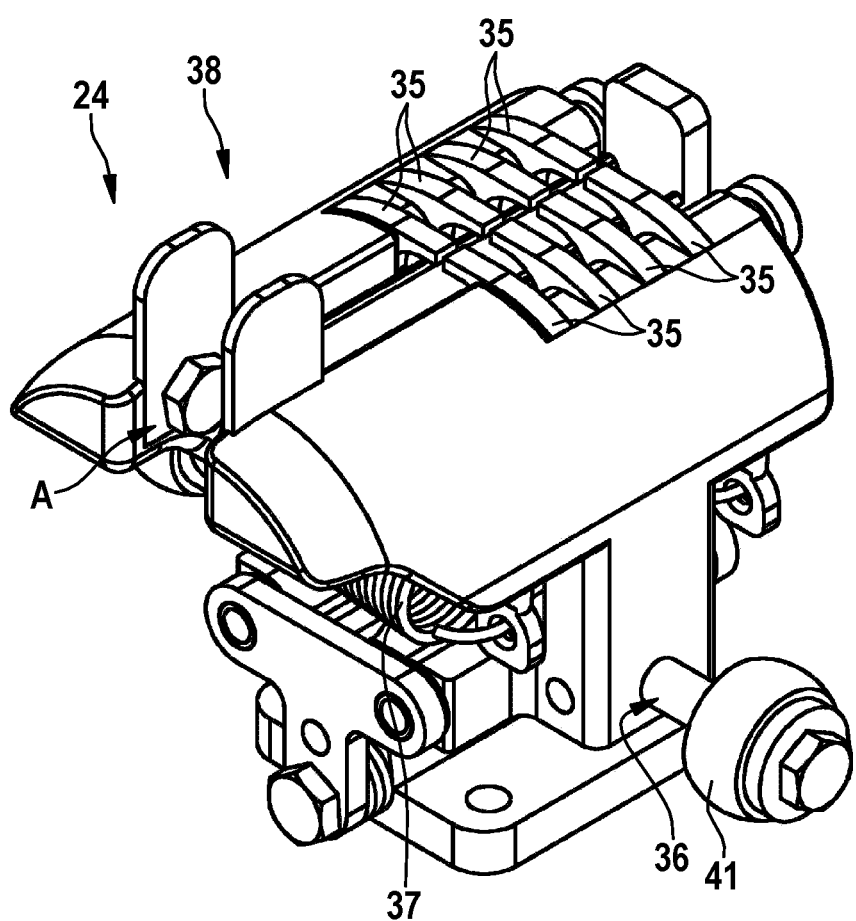
FIG. 6 is a schematic illustration of a holding element in a perspective view.

Further preferably, the holding element 24—shown in detail in FIG. 6—is so configured that the back part 12—shown in detail in FIG. 2—can be arranged on the holding element 24 in the direction of transport T along the transport path 20 with the neck side 13 in front. By arranging the back part with the neck side 13 in front, the first cut into the back part 12 by means of the at least one loosening means 26 of the first cutting means assembly 25 generally also takes place starting from the neck side 13. During the loosening process, the loosening means 26 then leave the back part 12 at the hip side 14.

The first cutting means assembly 25, in particular the at least one loosening means 26, is preferably configured so as to be deflectable against a spring force by means of a spring element—not shown in the figures. The spring element can thereby preferably be formed by a mechanical spring, for example a tension spring, although pneumatic solutions are also conceivable as an alternative. Furthermore, the first cutting means assembly 25 is further preferably formed by a pair of at least substantially opposing loosening means 26, wherein the loosening means 26 are arranged on either side of the transport path 20, such that, between the two loosening means 26 in the region of the centre axis M, a gap A is formed by the mutually opposing loosening means 26 for avoiding the spinal column 17.

As is shown in FIG. 3, the loosening means 26 preferably have a curved shape and are configured to cut the back part 12 or parts thereof along the course of the direction of transport T starting from the neck side 15 and to leave the back part 12 or parts thereof again at the hip side 16, wherein the loosening means 26 loosen the back-flesh 11 along the rib structure 18. The back-flesh 11 is loosened in that the loosening means 26 completely loosen an extensive region of the back-flesh 11 above the rib structure 18. However, the back-flesh 11 generally remains connected to the back part 12, or to the remaining back-flesh 11, in the region of the spinal column 17. Further preferably, at least one of the loosening means 26 is adjustable in terms of height relative to the holding element 24 and/or in terms of distance from the centre axis M. The loosening means 26 are preferably fixedly arranged along the transport path 20, so that the back part 12 arranged on the holding element 24 is guided through the loosening means 26, whereby loosening takes place.

In the second cutting means assembly 27, the at least one separating knife 28 for completely separating the back-flesh 11 is preferably configured and arranged at least substantially along the spinal column 17. For this purpose, the back part 12 arranged on the holding elements 24 is guided along the transport path 20 and brought into engagement with the separating knife 28. In FIG. 3, the separating knife 28 is arranged over the entire width of the transport path 20 so as to provide as complete a separating cut as possible of the back-flesh 11. The already loosened or cut back-flesh 11 is separated by means of the separating knife 28 in that the separating knife 28 separates the back-flesh 11 along the spinal column 17 and as close as possible thereto. For this purpose, the separating knife 28 is preferably fixedly arranged along the transport path 20, so that the back part 12 arranged on the holding element 24 is guided through the separating knife 28, whereby separation takes place. The at least one separating knife 28 is preferably configured and adapted so as to be adjustable in terms of height relative to the holding element 24.

The at least one separating knife 28 is preferably configured so as to be deflectable against a spring force by means of a spring element—not shown in the figures. The spring element can preferably be formed by a mechanical spring, for example a tension spring, although pneumatic solutions are also conceivable as an alternative. It is additionally apparent from FIG. 3 that the at least one separating knife 28 is advantageously v-shaped or u-shaped 32. The v-shape or u-shape 32 thereby corresponds substantially to the contour of the spinal column 17 of the back part 12, so as to separate the back-flesh 11 with minimal losses as the back part is guided through.

FIG. 1 shows that the transport conveyor 21 preferably has an upper run 33 and a lower run 34, wherein the first cutting means assembly 25 and/or the second cutting means assembly 27 is arranged in the region of the lower run 34. In the course of the lower run 34, the back part 12 is guided on the holding element 24 generally in the "upside-down position", whereby the back-flesh 11 automatically falls down from the back part 12 by means of gravity following the separating operation. The separated back-flesh 11 can preferably be discharged via at least one discharge device—not shown in the figures—which is arranged along the transport path 20 in the direction of transport T at least in some regions and which is configured and adapted for discharging the separated back-flesh 11 and/or the back part 12 or parts thereof freed of the back-flesh 11, in particular beneath the first cutting means assembly 25 and/or beneath the second cutting means assembly 27. The discharge device for discharging the back-flesh 11 can further preferably be configured and arranged transversely in the course of the direction of transport T or along the direction of transport T.

The back part 12 or parts thereof can preferably be arranged with the body interior side 16 on the holding element 24 by non-positive and/or positive locking engagement, in particular only in the region of the spinal column 17 and/or of the rib structure 18 having the rib pairs 19. For this purpose, the holding element 24 comprises, as is shown in FIG. 6, at least one retaining tooth 35 which is configured and adapted to be in operative connection by non-positive and/or positive locking engagement with the back part 12 in the region of the spinal column 17 and/or of the rib structure 18 having the rib pairs 19. As is shown in FIG. 5, the holding element 24 can for this purpose be configured with the at least one retaining tooth 35 in a mounting position 39 and in a clamping position 38. In the present figures, the holding element 24 in each case comprises four retaining teeth 35 arranged opposite one another, wherein in the mounting position 39 the retaining teeth 35 are open, that is to say the opposing retaining teeth 35 are spaced apart from one another, in order to receive a back part 12 on the holding element 24 with the body interior side 16. In the clamping position 38, as is shown for example in FIG. 6, there is substantially no distance between the retaining teeth 35, whereby the spinal column 17 and/or the rib structure 19 is retained.

The method will be described in greater detail in the following text.

The method serves and is suitable for recovering back-flesh 11 or parts thereof from back parts 12 or parts thereof, also referred to generally hereinbelow only as back-flesh 11 and back parts 12, respectively, and is illustrated in FIG. 1. For recovering the back-flesh 11, the back parts 12 are first provided on a transport conveyor 21 which is arranged along a transport path 20 with a centre axis M in a direction of transport T and which has a drive unit 22 and a transport element 23. The back parts 12 to be conveyed are positioned by non-positive and/or positive locking engagement on at least one holding element 24 arranged on the transport element 23. For this purpose, the holding element 24 having the retaining teeth 35 is opened, in order that the back part 12 is arranged with the body interior side 16 therein, and is then fixed on the one hand to the spinal column 17 by means of the retaining teeth 35 by non-positive locking engagement and on the other hand by positive-locking engagement by the engagement of the retaining teeth 35 into the rib-free region of the rib structure 18. The back part 12 is then transported in the direction of transport T along the transport path 20 and the back part 12 is guided along the first cutting means assembly 25 which is arranged along the transport path 20 in the region of the transport element 23 and which has at least one loosening means 26. By means of the at least one loosening means 26, the back-flesh 11 is loosened at least substantially in some regions along the rib structure 18. By further transport of the back part 12 with the loosened back-flesh 11, a second cutting means assembly 27 which is arranged downstream of the first cutting means assembly 25 and which has at least one cutting knife 28 comes into engagement with the back part 12, wherein the back-flesh 11 is separated at least in some regions at least substantially along the spinal column 17.

As is shown in FIG. 4, the back part 12, before, during and/or after positioning by non-positive and/or positive locking engagement on the holding element 24, is preferably pressed onto the holding element 24 from the body exterior side 15 by means of a pressing device 29 having a pressing element 30.

For practical changing between the operating positions of the holding element 24, that is to say changing between the mounting position 39 and the clamping position 38, the holding element 24 preferably comprises at least one trigger element 36, wherein the trigger element 36 is in operative connection with at least one of the retaining teeth 35 such that the trigger element 36 effects a change from the mounting position 39 into the clamping position 38. As is shown in FIG. 6, the holding element 24 preferably has a trigger element 36 on each of two sides, which trigger elements can be in the form of a rod-shaped prolongation. The holding element 24 preferably further has at least one spring element 37 which is adapted so that it can be pretensioned under spring loading such that on activation of the trigger element 36 the holding element 24, or at least one of the retaining teeth 35, can be transferred into the mounting position 38 and on deactivation of the trigger element 36 the holding element 24, or the at least one retaining tooth 35, can automatically be transferred into the clamping position 38.

In the case of the holding elements 24 shown in the figures, activation of the trigger element 36 takes place in that the trigger element 36 is moved in the course of a pivoting movement, wherein force that is greater than the force of the spring element 37 is applied to the trigger element 36. The application of force can in principle take place in any desired way. As a result of the application of force, a change from the clamping position 38 into the mounting position 39 takes place.

The apparatus 10 preferably comprises at least one engagement element 40 which is configured and adapted to act together with the trigger element 36 of the holding element 24 in order to effect a change between the mounting position 39 and the clamping position 38 of the at least one retaining tooth 35. In FIG. 1 and FIG. 4, the engagement element 40 is shown as continuous path control, also called cam track, in which the trigger element 36 can be guided at least in part, whereby the application of force for activating the trigger element 36 takes place by changing the guiding of the trigger element 36 in that the trigger element 36 is forcibly guided in the engagement element 40 by the forward movement of the holding element 24. Depending on the profile of the continuous path control of the engagement element 40, control of the engagement element 40 with the trigger element 36 can thus take place as required. For convenient guiding of the trigger element 36 in the engagement element 40, the trigger element 36 is configured with a running wheel 41 which can be guided in the engagement element 40, whereby the application of force can be transferred to the trigger element 36. In this manner, the trigger element 36 in each case allows the retaining teeth 35, or the holding element 24, to change between the mounting position 39 and the clamping position 38.

In addition, an engagement element 40 can preferably be arranged after the second cutting means assembly 27 in order to remove the back part 12 separated from the back-flesh 11 from the holding element 24, so as to mount a further back part 12 in the further course, whereby continuous operation of the apparatus 10 for recovering back-flesh 11 is ensured.

The method is particularly preferably carried out with an apparatus, as have been described above in various embodiments.

The invention claimed is:

1. An apparatus configured and adapted for recovering back-flesh or parts thereof from back parts or parts thereof of poultry carcasses having a neck side, a hip side, a body exterior side, a body interior side, wherein the back part includes a spinal column or parts thereof and a rib structure having at least vertebral rib pairs or parts thereof, and wherein the back-flesh includes at least one scapula, the apparatus comprising:

a transport conveyor adapted for transporting the back parts or parts thereof along a transport path with a centre axis in a direction of transport, the transport conveyor having a drive unit and a transport element for conveying at least one holding element, arranged on the transport element, for receiving the back part or parts thereof during transport at least in some regions along the transport path;

a first cutting assembly arranged along the transport path in a region of the transport element, the first cutting assembly having at least one loosening means for loosening the back-flesh at least in some regions substantially along the rib structure; and a second cutting assembly arranged along the transport path downstream of the first cutting assembly in the direction of transport in the region of the transport element, the second cutting assembly having at least one separating knife for separating the loosened back-flesh or parts thereof at least in some regions substantially along the spinal column;

wherein the holding element is configured such that the back part or parts thereof is arranged on the holding element by non-positive and/or positive locking engagement.

2. The apparatus according to claim 1, further comprising a pressing device arranged upstream of the first cutting assembly, the pressing device having a pressing element, the pressing device being adapted to press the received back part on the holding element from the body exterior side using the pressing element.

3. The apparatus according to claim 1, wherein the holding element is configured such that the back part or parts thereof are arranged on the holding element in the direction of transport along the transport path with the neck side leading.

4. The apparatus according to claim 1, wherein the at least one loosening means of the first cutting assembly is deflectable against a spring force of a spring element.

5. The apparatus according to claim 1, wherein the at least one loosening means of the first cutting assembly comprises a pair of at least substantially opposing loosening means, the loosening means being arranged on either side of the transport path such that, between the two loosening means in the region of the centre axis, a gap is formed by the mutually opposing loosening means for avoiding the spinal column.

6. The apparatus according to claim 5, wherein the loosening means each have a curved shape and are configured to cut the back part or parts thereof along a course of the direction of transport starting from the neck side and to leave the back part or parts thereof again at the hip side, wherein the loosening means loosen the back-flesh along the rib structure.

7. The apparatus according to claim 5, wherein at least one of the loosening means is adjustable in terms of height relative to the holding element and/or in terms of distance from the centre axis.

8. The apparatus according to claim 1, wherein the at least one separating knife is configured and adapted for completely separating the back-flesh at least substantially along the spinal column.

9. The apparatus according to claim 1, wherein the at least one separating knife is configured and adapted so as to be adjustable in terms of height relative to the holding element.

10. The apparatus according to claim 1, wherein the at least one separating knife is configured so as to be deflectable against a spring force of a spring element.

11. The apparatus according to claim 1, wherein the at least one separating knife is v-shaped.

12. The apparatus according to claim 1, wherein the transport conveyor has an upper run and a lower run, wherein the first cutting assembly and/or the second cutting assembly is arranged in a region of the lower run.

13. The apparatus according to claim 1, further comprising at least one discharge device for discharging the separated back-flesh and/or the back part freed of the back-flesh, the at least one discharge device being arranged at least in some regions along the transport path, beneath the first cutting assembly and/or beneath the second cutting assembly.

14. The apparatus according to claim 1, wherein the back part or parts thereof are arranged by non-positive and/or positive locking engagement on the holding element with the body interior side, only in the region of the spinal column and/or of the rib structure having the rib pairs.

15. The apparatus according to claim 1, wherein the holding element comprises at least one retaining tooth which is configured and adapted to be in operative connection by non-positive and/or positive locking engagement with the back part in a region of the spinal column and/or of the rib structure having the rib pairs.

16. A method for recovering back-flesh or parts thereof from back parts or parts thereof of poultry carcasses having a neck side, a hip side, a body exterior side, and a body interior side, wherein the back part includes a spinal column or parts thereof and a rib structure having at least vertebral rib pairs or parts thereof, and wherein the back-flesh includes at least one scapula, the method comprising:

providing the back parts or parts thereof to be processed on a transport conveyor which is arranged along a transport path with a centre axis in a direction of transport and which has a drive unit and a transport element;

positioning the back parts or parts thereof to be conveyed by non-positive and/or positive locking engagement on at least one holding element arranged on the transport element;

transporting the back part or parts thereof in the direction of transport along the transport path;

guiding the back part or parts thereof along a first cutting assembly which is arranged along the transport path in a region of the transport element, the first cutting assembly having at least one loosening means;

loosening the back-flesh at least substantially in some regions along the rib structure using the at least one loosening means;

guiding the back part or parts thereof with the cut back-flesh along a second cutting assembly which is arranged along the transport path downstream of the first cutting assembly in the direction of transport in the region of the transport element, the second cutting assembly having at least one separating knife; and separating the back-flesh at least in some regions at least substantially along the spinal column.

17. The method according to claim 16, wherein the back part, before, during and/or after positioning on the holding element by non-positive and/or positive locking engagement, is pressed onto the holding element from the body exterior side by a pressing device having a pressing element.

18. The method according to claim 16, wherein the back part or parts thereof is transported on the holding element in the direction of transport along the transport path with the neck side leading.

19. The method according to claim 16, wherein the at least one loosening means comprises a pair of opposing loosening means, the back part or parts thereof being cut by the pair of opposing loosening means along a course of the direction of transport starting from the neck side and the loosening means leave the back part or parts thereof again at the hip side, wherein the back-flesh is loosened by the loosening means along the rib structure.

20. The method according to claim 16, wherein processing by the first cutting assembly and/or by the second cutting assembly takes place in a region of a lower run of the transport conveyor.

21. The method according to claim 16, further comprising discharging the separated back-flesh and/or the back part or parts thereof freed of the back-flesh by at least one discharge device arranged at least in some regions along the transport path in the direction of transport, beneath the first cutting assembly and/or beneath the second cutting assembly.

22. The method according to claim 16, wherein the back part or parts thereof is held with the body interior side on the holding element by non-positive and/or positive locking engagement, only in the region of the spinal column and/or of the rib structure having the rib pairs.

23. The method according to claim 16, wherein the back part or parts thereof is in operative connection with the back part or parts thereof by non-positive and/or positive locking engagement in a region of the spinal column and/or of the rib structure having the rib pairs by at least one retaining tooth comprising the holding element.

24. The method according to claim 16, wherein, on separation of the back-flesh, at least one scapula or parts thereof remains in the back-flesh.

* * * * *